Figure 6:
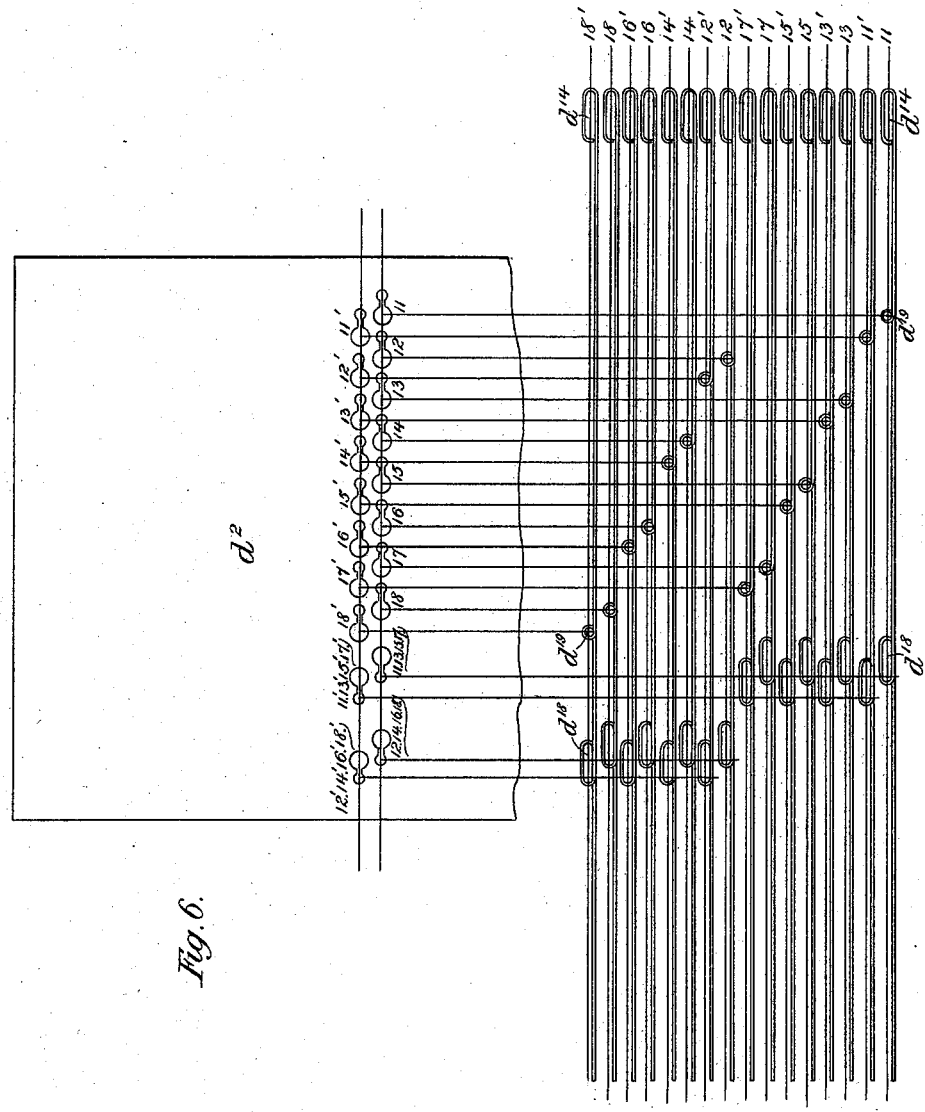

(No Model.) 8 Sheets—Sheet 1.
E. CROSSLEY & H. N. MELLOR.
JACQUARD MECHANISM FOR LOOMS.
No. 402,309. Patented Apr. 30, 1889.
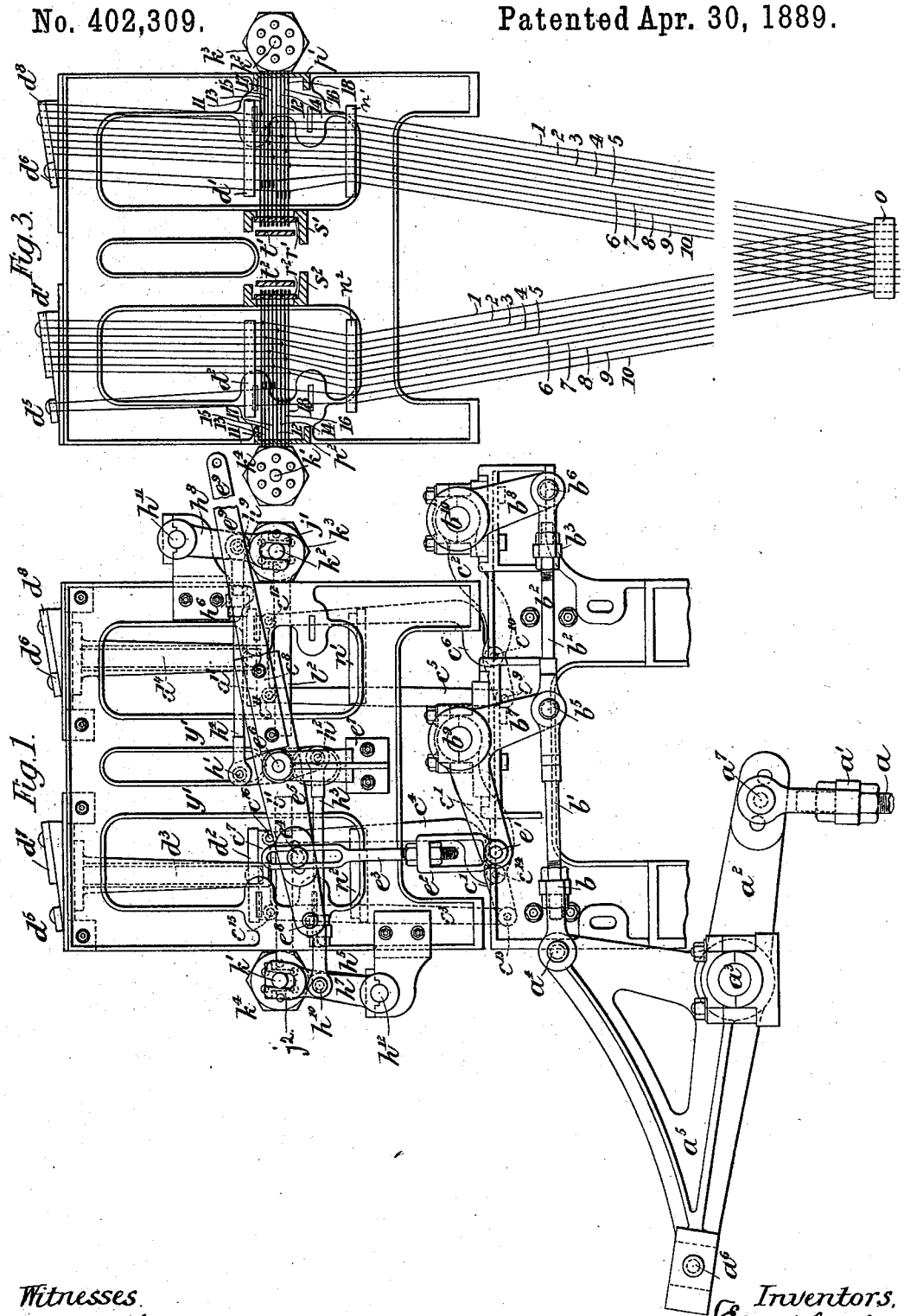
Witnesses
Josiah Bedon
Geo. M. Finckel
Inventors,
Edward Crossley
Henry Norman Mellor
by John J. Halsted
their Atty.

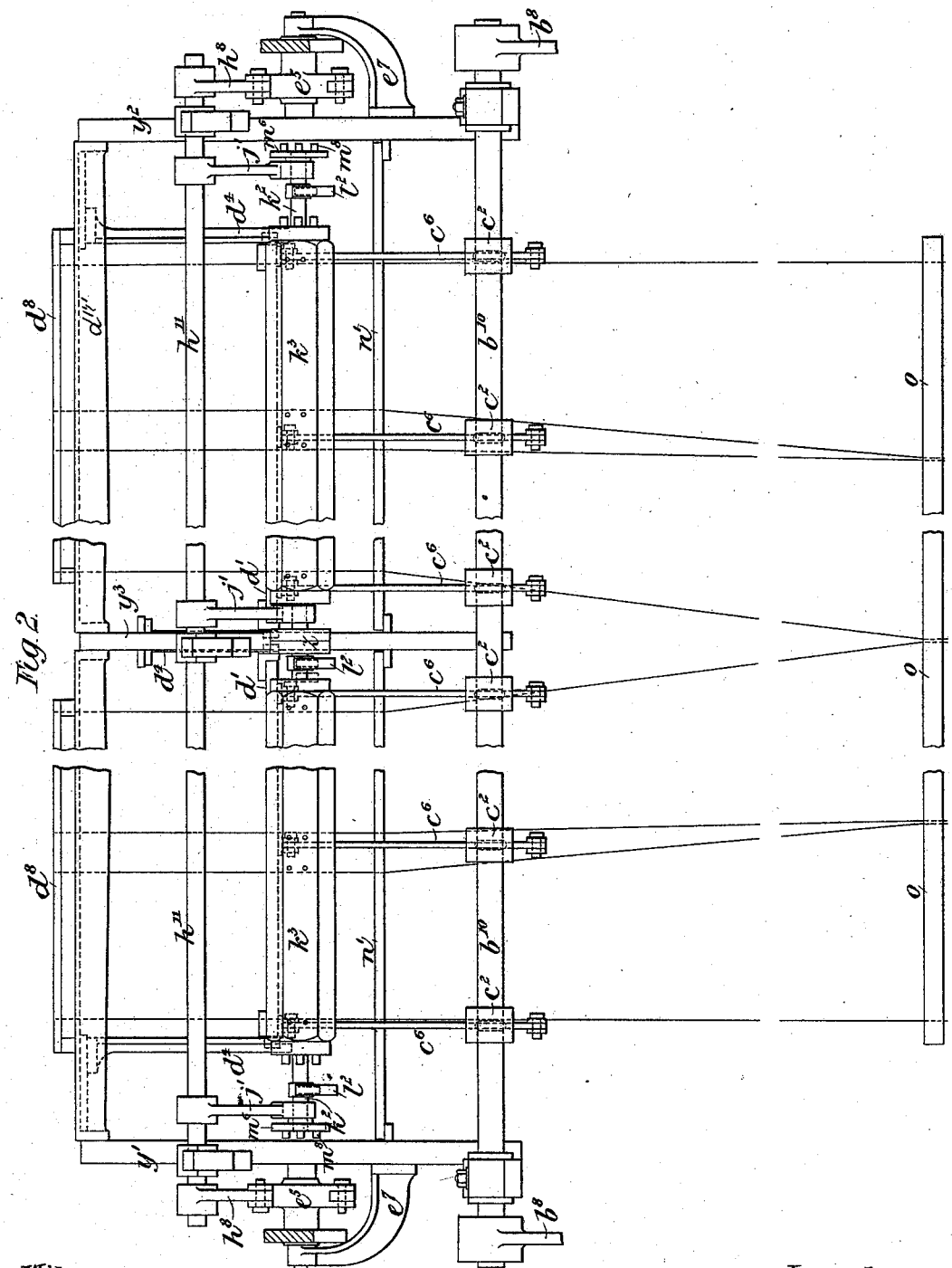

(No Model.) 8 Sheets—Sheet 3.
E. CROSSLEY & H. N. MELLOR.
JACQUARD MECHANISM FOR LOOMS.
No. 402,309. Patented Apr. 30, 1889.
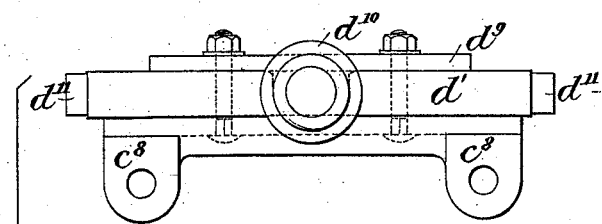
Fig. 4.
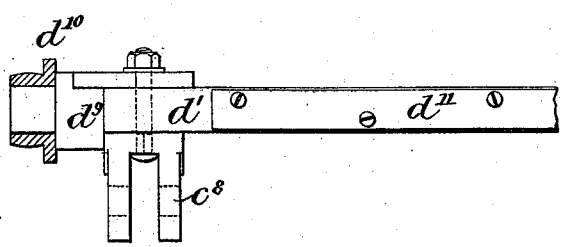
Fig. 5.
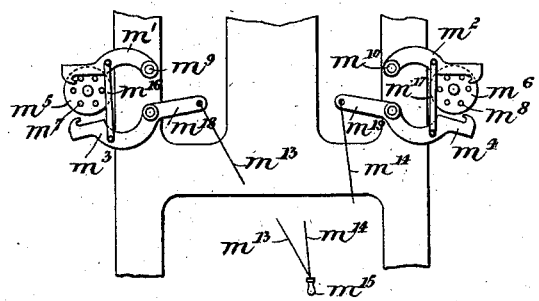
Witnesses.
Josiah Bedon
Geo. M. Pinckel
Inventors
Edward Crossley
Henry Norman Mellor
by John J. Halsted & Son
their Attys.

(No Model.) 8 Sheets—Sheet 4.
E. CROSSLEY & H. N. MELLOR.
JACQUARD MECHANISM FOR LOOMS.

No. 402,309. Patented Apr. 30, 1889.

Witnesses,
Will T. Norton
J. D. Cross

Inventors,
Edward Crossley
Henry N. Mellor
By their Attorneys
John J. Halsted & Son.

(No Model.) 8 Sheets—Sheet 5.
E. CROSSLEY & H. N. MELLOR.
JACQUARD MECHANISM FOR LOOMS.
No. 402,309. Patented Apr. 30, 1889.
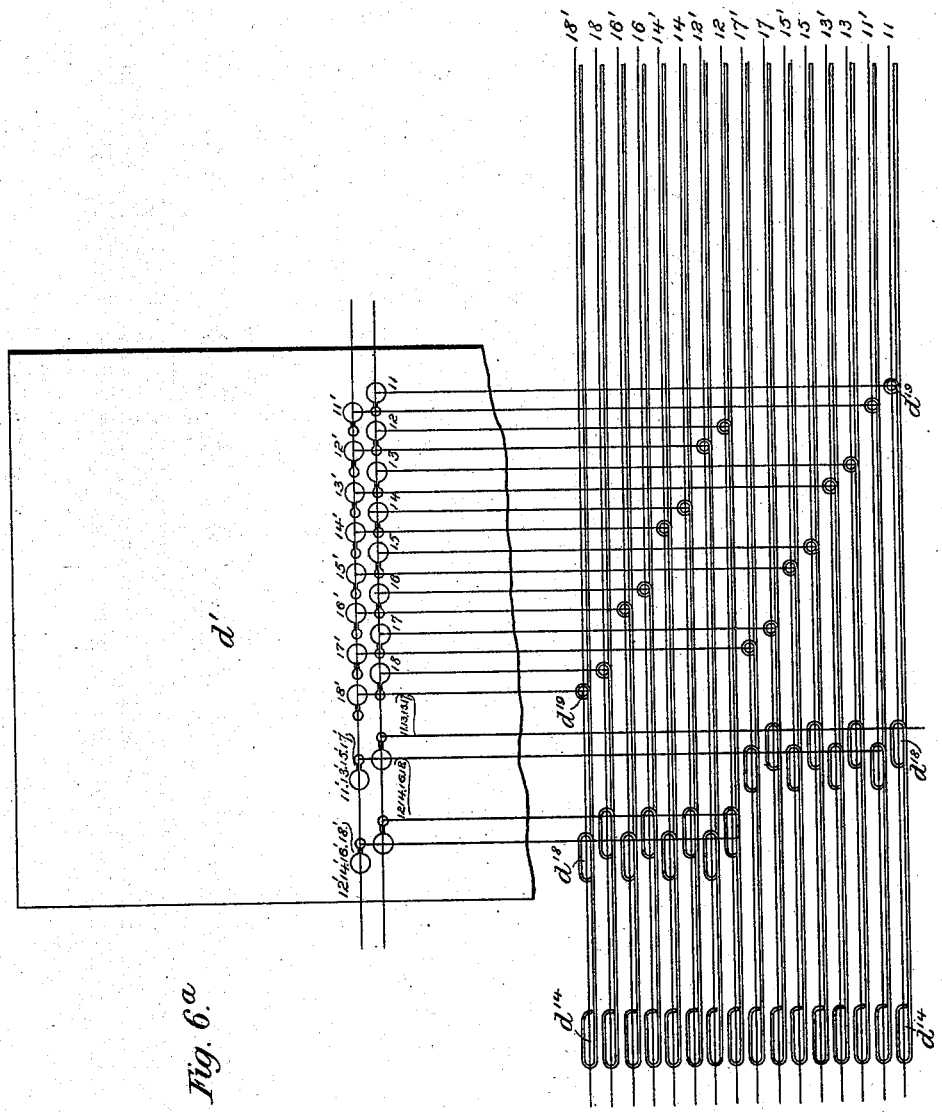

(No Model.) 8 Sheets—Sheet 6.
E. CROSSLEY & H. N. MELLOR.
JACQUARD MECHANISM FOR LOOMS.
No. 402,309. Patented Apr. 30, 1889.
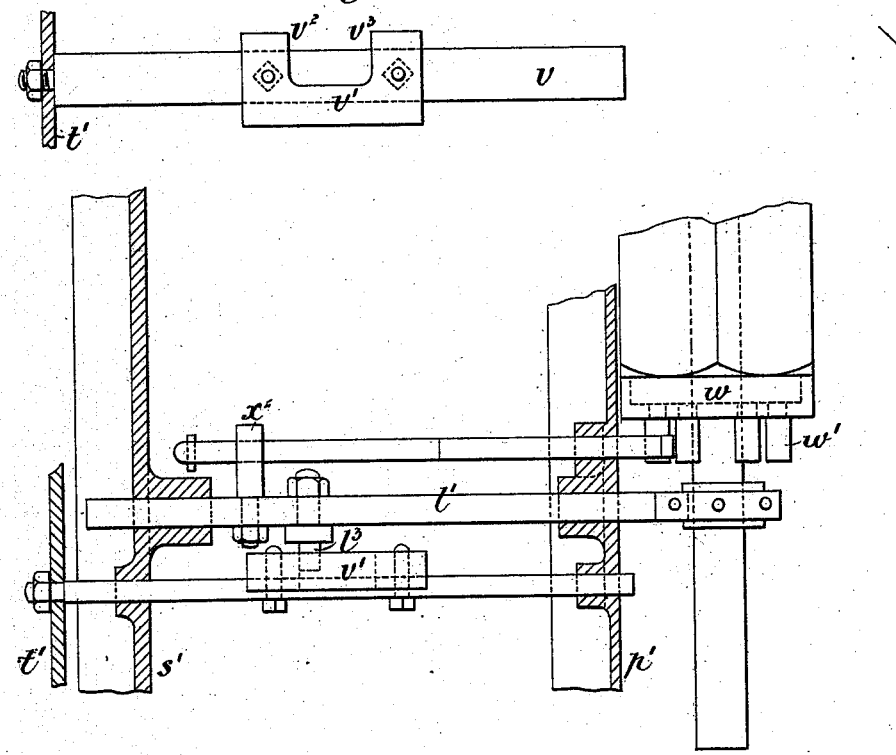
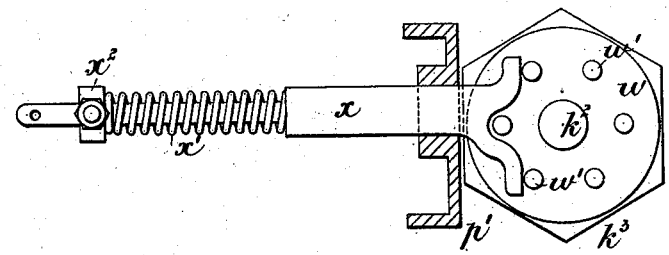
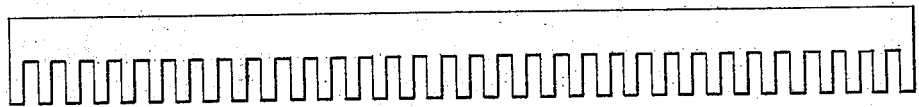
Witnesses.
Josiah Bedon
Geo. M. Finckel
Inventors.
Edward Crossley
Henry Norman Mellor
by John J. Halsted & Son
their attys.

(No Model.) 8 Sheets—Sheet 7.
E. CROSSLEY & H. N. MELLOR.
JACQUARD MECHANISM FOR LOOMS.
No. 402,309. Patented Apr. 30, 1889.
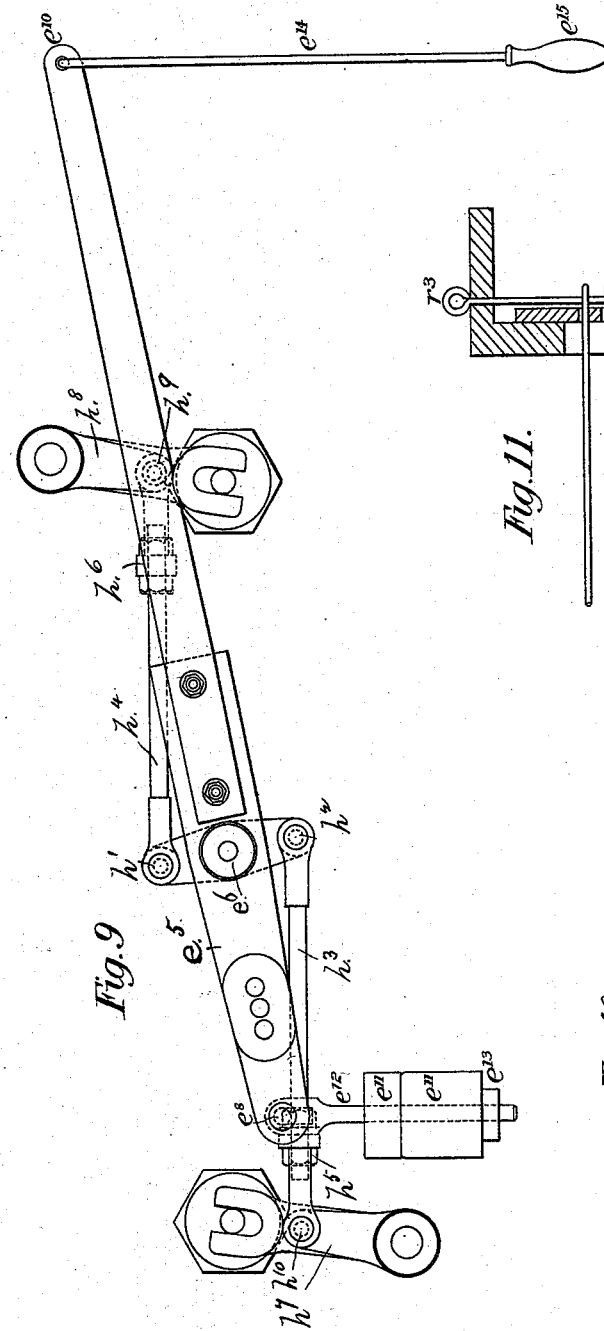
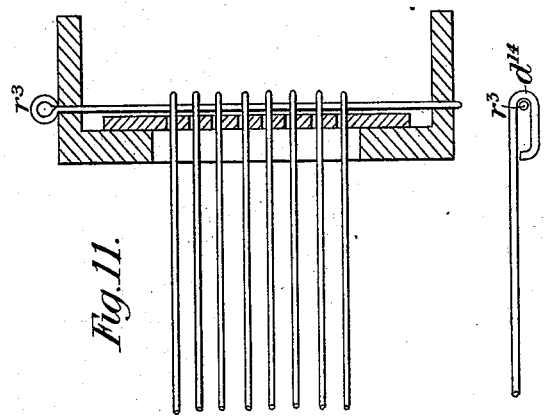
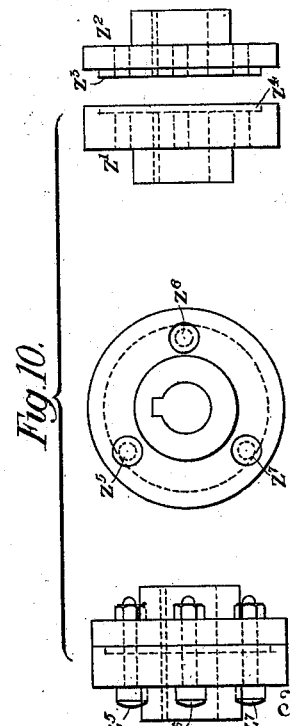

(No Model.) 8 Sheets—Sheet 8.
E. CROSSLEY & H. N. MELLOR.
JACQUARD MECHANISM FOR LOOMS.
No. 402,309. Patented Apr. 30, 1889.
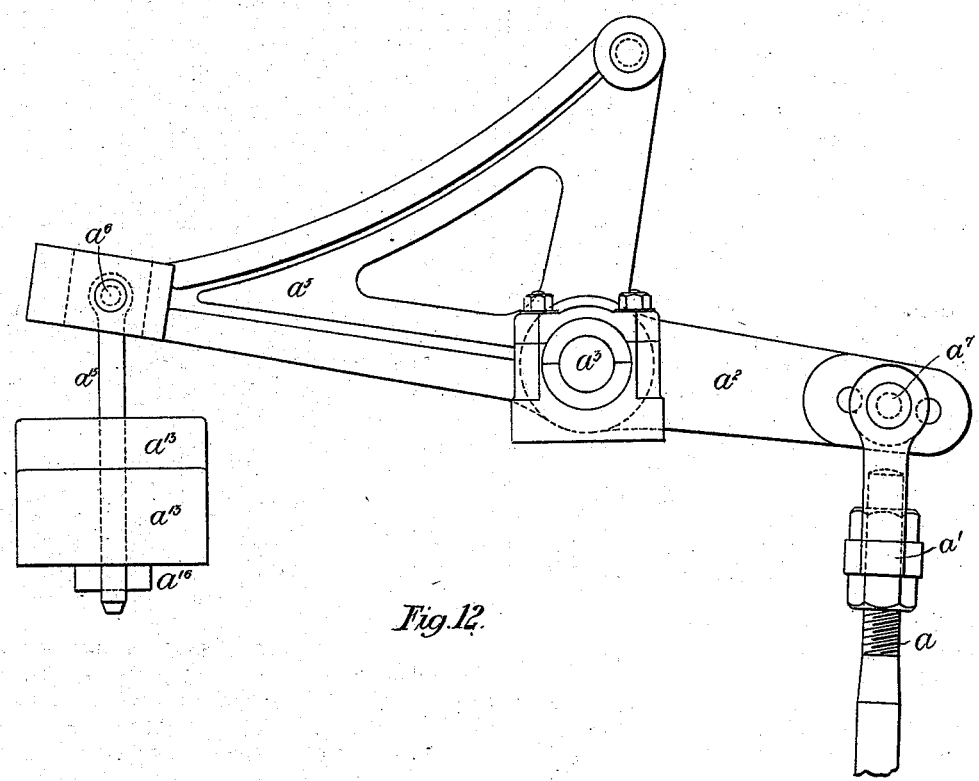
Fig. 12.
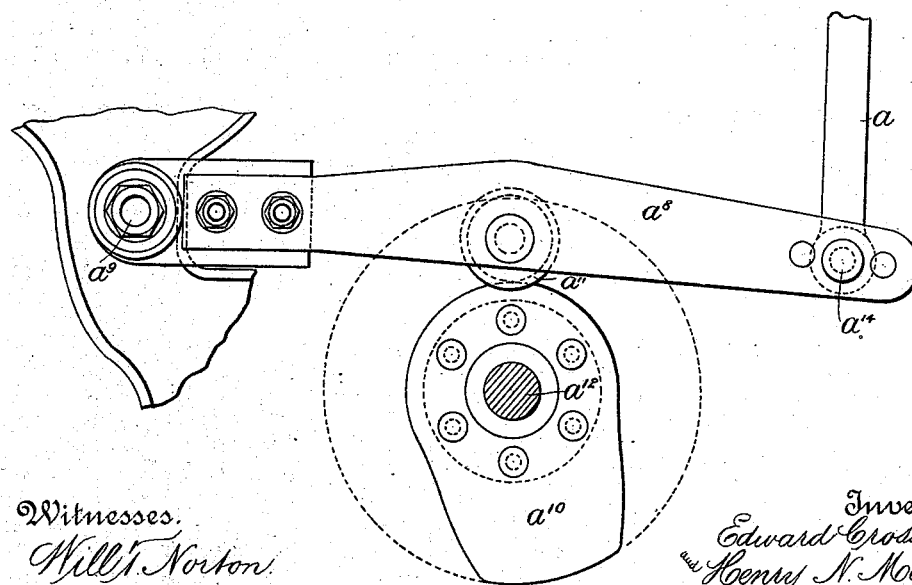
Witnesses.
Will T. Norton
J. T. Cross
Inventors.
Edward Crossley
and Henry N. Mellor
By their Attorneys
John J. Halsted & Son

UNITED STATES PATENT OFFICE.

EDWARD CROSSLEY AND HENRY NORMAN MELLOR, OF HALIFAX, COUNTY OF YORK, ENGLAND.

JACQUARD MECHANISM FOR LOOMS.

SPECIFICATION forming part of Letters Patent No. 402,309, dated April 30, 1889.

Application filed June 16, 1885. Serial No. 168,882. (No model.) Patented in England August 29, 1884, No. 11,763, and in France June 6, 1885, No. 169,391.

*To all whom it may concern:*

Be it known that we, EDWARD CROSSLEY and HENRY NORMAN MELLOR, subjects of the Queen of Great Britain, residing at Halifax, in the county of York, England, have invented new and useful Improvements in Jacquard Mechanism for Looms Employed for the Purpose of Weaving Carpets and other Fabrics, (patented in Great Britain, No. 11,763, August 29, 1884, and in France, No. 169,391, June 6, 1885,) of which the following is a specification.

The invention consists in certain improvements, hereinafter described, in the construction of Jacquard machinery for looms employed for the manufacture of carpets and other fabrics where a large number of selecting-needles in the Jacquard are necessary.

In the manufacture of Brussels carpets and some other fabrics the Jacquard machines usually employed are considerably wider than the width of cloth they weave. This difference between the width of the Jacquard machines and the width of the cloth woven causes some of the harness-bands to be considerably out of the vertical line, and the wider the looms the farther from the vertical line the harness-bands become, and the farther the harness-bands are from the vertical line the less satisfactorily do they work, as they do not pass so easily through the holes of the boards, and they require heavier weights to draw them to their places. The more vertical of the harness-bands are shorter than those less vertical, and do not, therefore, stretch as much, and this difference has a tendency to cause an uneven shed or lift of the warps. In order to obviate these disadvantages, instead of using only one cylinder carrying cards situated toward the front of the Jacquard machine and acting upon one set of selecting-needles, as is customary in ordinary Jacquard machines, we construct a double arrangement of Jacquard machine having two cylinders, each carrying cards, one cylinder situated toward the front of the Jacquard machine and one toward the back part of the Jacquard machine. The cards carried by the different cylinders act upon different sets of selecting-needles, and the cylinders are so arranged and operated as to cause the cards they carry to act simultaneously upon their respective sets of selecting-needles to form one shed or lift of the warps. One portion of the harness-bands is drawn from the comber-board to the front part of the Jacquard machine and the other portion to the back part of the Jacquard machine. By this arrangement the whole of the harness-bands is kept nearly vertical and also almost equal in length, and the width of the Jacquard machine is only about the same width as that of the cloth woven.

By the use, as above described, of two sets of needles acted upon simultaneously by the cards carried by two cylinders, the sets of needles being placed one behind the other from the front of the loom, the width of the Jacquard machine is reduced to about one-half of the width of Jacquard machines constructed on the ordinary principle, and the arrangement also enables the harness-bands to be kept very nearly vertical and all of about the same length.

Although we have described as a suitable arrangement each part of our double Jacquard apparatus as having only one cylinder, (and one top board, guide-board, lift-board, push-plate, &c.,) it will be obvious that the front part of the Jacquard machine may be divided into two or more parts, so as to embrace two or more cylinders, two or more lift-boards, two or more guide-boards, two or more push-plates, &c., and the back part of the Jacquard machine may be similarly divided, but every one of these parts must act simultaneously with the corresponding parts in other portions of the Jacquard machine.

In order to enable our invention to be fully understood, we will now proceed to describe an arrangement which we find advantageous for carrying it into effect by reference to the accompanying drawings, in which—

Figure 1 is a side view of a Jacquard machine constructed according to our invention and arranged for the manufacture of Brussels and velvet carpets. Fig. 2 is a front view of the machine, showing the direction of the harness-bands. Fig. 3 is a side view with the outside framing removed, and showing various parts of the machine in section and the arrangement of the needles and harness-bands. Fig. 4 shows a front and side view of the end of a trap or lift board on a large scale. Fig. 5 is a side view showing suitable arrangements for turning over the cylinders. Figs. 6 and 6ª are views together, showing upon a large scale the selecting-needles and the manner in which the trap and lift boards are bored for the front and back part of the Jacquard machine. Fig. 7 shows views of the cylinder-slide, the push-plate slide, and the slide for steadying the cylinder in plan, and the slide for steadying the cylinder and the slide for carrying the push-plate in elevation. Fig. 8 is a view of a suitable comb for assisting the stampers. Fig. 9 shows the cross-head lever with connections for giving motion to the cylinders and with weights and the cord used for giving motion to the cylinders by hand. Fig. 10 shows the coupling Z in detail. Fig. 11 shows the pins for keeping the needles in the face-plate. Fig. 12 shows the cam, lever, and connections for giving motion to the Jacquard machine.

Similar letters in all the figures represent similar parts.

In the drawings, $a$ is a connecting-rod, by which the motion derived from a lever, $a^8$, connected to it by the stud $a^{14}$, is transmitted to the lever $a^2$. (See Fig. 12.) The lever $a^8$ works upon the stud $a^9$, secured to the framing of the loom, and is actuated by the cam $a^{10}$, acting upon the pulley $a^{11}$. The cam $a^{10}$ derives its motion from the shaft of the loom $a^{12}$. $a'$ is a swivel to adjust the position of the lever $a^2$ and its dependent parts. The said lever $a^2$ is connected to the swivel $a'$ by a stud, $a^7$, and is keyed on and imparts motion to the shaft $a^3$. A bell-crank lever, $a^5$, is also keyed on the shaft $a^3$, and is so arranged that a balance weight or weights, $a^{13}$, Fig. 12, can be attached to the stud $a^6$ by means of the rod $a^{15}$ and the cotter $a^{16}$.

A regulating-swivel, $b$, is attached to the lever $a^5$ by the stud $a^4$, and connects it with the rod $b'$, which is attached to the rod $b^2$ and the link arm or lever $b^7$ by a stud, $b^5$. A regulating-swivel, $b^3$, connects the rod $b^2$ with the link-arm $b^8$, said swivel being attached to the arm $b^8$ by means of the stud $b^6$. The lever $b^8$ is keyed on a shaft, $b^{10}$, upon which the lifting-levers $c^2$ are also keyed. The links $c^5$ and $c^6$ are connected with the levers $c^2$ by studs $c^9$ and $c^{10}$, and with the fixings $c^8$ by the studs $c^{11}$ and $c^{12}$. $d'$ is a lift or trap board secured to the fixings $c^8$. The bell-crank lever $b^7$ is keyed on the shaft $b^9$, upon which the lifting-levers $c'$ are also keyed. The links $c^3$ and $c^4$ are connected with the lever $c'$ by studs $c^{13}$ and $c^{14}$, and with the fixings $c^7$ by the studs $c^{15}$ and $c^{16}$. A lift or trap board, $d^2$, is secured to the fixings $c^7$.

At each end of the lift or trap boards $d'$ and $d^2$ is a bracket, $d^9$, (shown on an enlarged scale in Fig. 4,) carrying a pulley, $d^{10}$. The pulleys $d^{10}$ work in grooved guides $d^3$ and $d^4$, and cause the centers of the boards $d'$ and $d^2$ to move in vertical lines when lifted. The trap or lift boards are strengthened by metal strips $d^{11}$. When the rod $a$ is lifted by the cam and lever on the loom, the various levers described and their connections cause the shafts $b^9$ and $b^{10}$ to partially rotate, carrying with them the levers $c'$ and $c^2$, thereby causing the lift or trap boards $d'$ $d^2$ to be raised and to carry with them the bands of the harness selected by the cards, thus forming a shed of the warps.

It will be seen by the connections that both trap or lift boards are lifted simultaneously, and the levers in the front part of the Jacquard machine being similar to those in the back part of the Jacquard machine, the traverse of the trap or lift boards in both parts of the Jacquard machine will be the same.

One end of the cranked lever $b^7$ is attached by the stud $e'$ to the regulating-swivel $e^2$, which is connected with the slotted rod $e^3$. In the slot of the rod $e^3$ the stud $e^4$ works, and is secured to the cross-headed lever $e^5$. The lever $e^5$ works on the stud $e^6$, secured to the framing $y'$ of the machine and supported by the bracket $e^7$. At the end of the lever $e^5$ a weight or weights, $e^{11}$, are secured to the stud $e^8$ by means of the rod $e^{12}$ and a detaining device, $e^{13}$, these weights being omitted from Fig. 1 to avoid confusion.

The rods $h^3$ and $h^4$ connect the studs $h'$ and $h^2$ with the regulating-swivels $h^5$ and $h^6$, which are connected with the levers $h^7$ and $h^8$ by the studs $h^9$ and $h^{10}$. The levers $h^7$ and $h^8$ are keyed on the shafts $h^{11}$ and $h^{12}$. Upon the same shafts the forked levers $j'$ and $j^2$ are keyed. In the forked ends of these levers are inserted the shafts $k'$ and $k^2$ of the card-cylinders $k^3$ and $k^4$.

The shafts $k'$ and $k^2$ of the cylinders $k^3$ and $k^4$ are supported by the slides $l'$ and $l^2$. When the lift or trap boards $d'$ and $d^2$ are lifted by the partial rotation of the shafts $b^9$ and $b^{10}$, the slotted rod $e^3$ is lifted by the cranked lever $b^7$. When the bottom of the slot comes in contact with the stud $e^4$, it carries it forward, causing the lever $e^5$ to partially revolve on the stud $e^6$. This motion, by means of the connections already described, is imparted to the shafts $h^{11}$ and $h^{12}$ and to the forked levers $j'$ and $j^2$, which carry the cylinders $k^3$ and $k^4$ simultaneously with them away from the face-plates $p'$ and $p^2$, which are shown in section in Fig. 3. When the lift or trap boards fall, the weight or weights $e^{11}$, secured at the end of the lever $e^5$ to the stud $e^8$, brings the cylinders back to the face-plates.

Upon the shafts $k'$ and $k^2$ are keyed the plates or disks $m^5$ and $m^6$, (shown in Fig. 5,) in which are secured the projecting pegs $m^7$ and $m^8$. As the shafts $k'$ and $k^2$, carrying the cylinders and disks, travel from the face-plates, the pegs or pins $m^7$ and $m^8$ are caught by the catches $m'$ and $m^2$, carried by the studs $m^9$ and $m^{10}$, secured to the framing of the machine, and the shafts $k'$ and $k^2$ are caused to make one-sixth of a revolution, thus bringing the cards carried by new faces of the card-cylinders $k^3$ and $k^4$ to bear upon the needles. The catches $m'$ and $m^2$ are connected with the catches $m^3$ and $m^4$ by the links $m^{17}$ and $m^{16}$, and to the arms $m^{18}$ and $m^{19}$ of the catches $m^3$ and $m^4$ are attached the cords $m^{13}$ and $m^{14}$, which are joined at the handle $m^{15}$. When the handle is drawn down, the catches $m^3$ and $m^4$ are brought up to the pegs $m^7$ and $m^8$, and the catches $m'$ and $m^2$ are thrown out of gear, so that the direction in which the disks and cylinders are turned is reversed.

The lever $e^9$ is secured to the cross-head lever $e^5$, so that the cylinders can be turned by hand by means of a cord, $e^{14}$, with a handle, $e^{15}$, attached to it at $e^{10}$, the slot in the rod $e^3$ allowing the stud $e^4$ to work freely up and down for this purpose.

Fig. 6 shows two rows of needles with their eyes $d^{14}$, $d^{18}$, and $d^{19}$ as used in the front and back parts of the Jacquard machine, which have been removed from the machine, and are shown side by side for clearness.

The needles 11, 13, 15, 17, 12, 14, 16, and 18 are arranged in the face-plates $p'$ and $p^2$ and grates $r'$ and $r^2$ in a row in each part of the Jacquard machine, one below the other in the order named—that is to say, 11 at the top and 18 at the bottom. The needles Nos. 11' and 18' are placed in the second and next row to the needles Nos. 11 to 18, and are similarly arranged. They are followed by a third row of needles, like Nos. 11 to 18, and similarly arranged, and the fourth row consists of needles, like Nos. 11' and 18', similarly arranged. The remainder of the needles throughout both parts of the Jacquard machine are arranged in alternate rows in this manner. The holes in the trap or lift boards $d'$ and $d^2$ are marked with the numbers of the needles which act upon the bands passing through these holes, and the bands marked 1 are operated by the needles marked 11 and the bands marked 2 by the needles marked 12, and the bands marked 3 by the needles marked 13, and so on. When the cards carried by the card-cylinders $k^3$ and $k^4$ are brought toward the face-plates $p'$ and $p^2$, (shown in section in Fig. 3,) the selecting-needles opposite the blanks in the cards are carried forward by the cards until the knots on those of the harness-bands 1 2 3 4 5 6 $6^a$ 7 8 selected in both parts of the Jacquard machine are over the smaller of the double holes shown in the lift or trap boards in Fig. 6. When the lift or trap boards $d'$ and $d^2$ are raised, the knots are not able to pass through the smaller holes and the harness-bands are raised, lifting the required ends of warp to form a shed. When at rest, the knots of the harness-bands 9 are over the smaller of the holes through which they pass, and as the bands 9 pass through the long eyes $d^{18}$ of the needles 11 13 15 17 when none of the needles 11 13 15 17 are acted upon by the cards the band 9 remains unmoved and is lifted. Similarly, when none of the needles 12 14 16 18 are acted upon the bands 10 are raised.

The top boards, from which the harness is suspended, are each divided into two parts, $d^5$ and $d^7$ and $d^6$ and $d^8$, in order to allow for the adjustment of the bands 9 and 10, which pass through the long eyes of the selecting-needles.

It will be observed that in Figs. 3 and 6 the same numbers of reference are used to denote needles and bands in each part of the Jacquard machine, and the needles bearing similar numbers occupy similar positions in the face-plates, and the bands passing through their eyes are drawn to similar portions of the comber-board $o$—that is to say, the bands 1 are taken to the front of the board and the bands 10 to the back of the board. By this arrangement of needles and bands, if the bands 1 and 2 are used for one color or frame of worsted and the bands 3 and 4, 5 and 6, 7 and 8, 9 and 10, respectively, for others, the cards for the cylinder $k^3$ must be stamped in a similar manner to the cards for the cylinder $k^4$. It will therefore be seen that by employing needles made and arranged as above described, and as shown in Figs. 3 and 6, we are enabled to employ cards similarly stamped for the cylinders used in the front and back part of the loom, and we find it of great advantage (though not absolutely necessary) to adopt this method, as it simplifies and reduces the labor of the stamper.

In drawing the harness-bands from the guide-boards $n'$ and $n^2$ to the comber-board $o$, by preference we draw a small number of bands from the board $n'$ to the comber-board $o$, and then an equal number of bands from the board $n^2$ to the board $o$—say ten, twenty, thirty, or forty bands from each in turn—until the whole are disposed of, always taking the bands in rows from front to back, as in Fig. 3. By this means the harness-bands are kept nearly in the vertical line and the amount of friction is considerably reduced. When the harness-bands are drawn to the comber-board in turns from each guide-board, in stamping the cards we place a comb, of steel or other material, Fig. 8, over the design, so that only that portion of the design which comes between the teeth of the comb is visible to the stamper. In this comb the teeth and spaces between the teeth are equal in width—that is to say, the width of a space is equal to the width of a tooth, and this width is exactly equal to a required number of squares in the design paper. If twenty bands are drawn from the front part of the machine and twenty bands from the back part of the machine, alternately, the width of the teeth is just four squares of the design, (the selection of five harness-bands being controlled by one square.) If thirty bands are drawn, the width is six squares, and so on. When the whole of the squares which are visible have been stamped, a card is ready, say, for the front part of the Jacquard machine, and if the comb is moved four squares, so that the squares which have been hidden are visible and another card be stamped, the second card may occupy a position in the back part of the Jacquard machine similar to that occupied by the first and in the front part of the machine. This method of stamping the cards is that which we have found to give good results with the described arrangement of needles and harness; but it will be obvious that other methods of stamping the cards can be employed to suit the arrangement of the needles and harness.

The selecting-needles are supported at one end by the face-plates $p'$ and $p^2$, and at the other by the grates $r'$ and $r^2$, which are attached to the back rails, $s'$ and $s^2$.

Pins $r^3$ (see Fig. 11) are secured in the back rails, $s'$ and $s^2$, and pass through the long eyes $d^{14}$ at the ends of the selecting-needles, thus preventing the needles from being pushed or jerked out of the holes in the face-plates.

To secure the return of the selecting-needles to their position after having been operated upon by the cards, we find it advantageous, instead of using springs, to make use of push-plates $t'$ and $t^2$. These push-plates, which are of ordinary construction, are carried by slides, one of which is shown in Fig. 7, marked $v$. Upon this slide is secured the bracket $v'$. On the slide $l'$ is fixed a stud, $l^3$, the end of which projects into the recess of the bracket $v'$. When the cylinder is thrown out from the face-plate, the slide $l'$ is carried with it, and the stud $l^3$ travels freely in the recess of the bracket $v'$ until it comes to the end $v^3$ of the recess, when it carries the slide $v$ with it to the end of its traverse. This brings the push-plate up to the grate $r'$, and restores any needles which may be out of place to their proper position for the selection of the cards. As the cylinder comes toward the face-plate, the stud $l^3$ travels freely to the end $v^2$ of the recess in the bracket $v'$, and then carries the slide and push-plate back from the ends of the selecting-needles, thus leaving them free for the action of the card. The recess in the bracket $v'$ gives positive motion to the push-plate and reduces its traverse, enabling the grates $r'$ and $r^2$ to be nearer together, thus reducing the size of the Jacquard machine. Both ends of each push-plate are similarly supported and actuated.

In the plates $w$, which form the ends of the card-cylinders, are inserted pegs $w'$, and cross-headed slides are used to press simultaneously against two of these pegs $w'$, and thus to steady the cylinders after having been turned over and to hold the faces of the cylinders parallel to the face-plates. These plates can be also used for turning over the cylinders, in which case the disks $m^5$ and $m^6$, hereinbefore described, are not required. One of these cross-headed slides $x$ is shown in Fig. 7. It is pressed against two of the pegs by the spiral spring $x'$, which is kept in a state of compression by the lug $x^2$, secured to the slide $l'$. The spring $x'$ is sufficiently pliable to allow the cylinders to be turned by the catches.

Where it is necessary to use Jacquard machines of great width we find it advantageous to insert in the middle of the machine a support, as shown at $y^3$ in Fig. 2. In this case we make the top boards, guide-board, top rail, $d^{17}$, back rail, S', face-plate, and push-plate for the front of the Jacquard machine in two parts, and those for the back of the Jacquard machine also in two parts, and support the top rails, back rails, face-plates, and guide-boards by means of the middle support, $y^3$, and the end frames, $y'$ and $y^2$; but in order to secure the simultaneous motion of similar parts throughout the machine we prefer that the shafts actuating the cylinders and their dependent parts and the shafts actuating the lift or trap-boards shall extend in one piece throughout the whole width of the Jacquard machine; but it will be obvious that the shafts can be made in two parts securely coupled together.

We also prefer to construct the cylinders either upon one shaft or tube for the whole width of the machine; or, if they are constructed upon two shafts or tubes, to connect them by a suitable coupling, (such as at $z$,) so that they work practically as though they were on one shaft or tube.

The coupling Z is shown in Fig. 10, in which Z' and $Z^2$ are two disks, which are securely keyed upon the shafts or tubes carrying the cylinders. $Z^3$ is a projecting rim on the disk $Z^2$, which fits into a recess, $Z^4$, in the disk Z'. $Z^5$, $Z^6$, and $Z^7$ are bolts which pass through both the disks Z' and $Z^2$, and which secure them together.

In very wide Jacquard machines we also prefer to have at each end of the Jacquard machine suitable apparatus (such as that hereinbefore described) for turning over and actuating the cylinders, and the cranked lever $a^5$, with the connections to the shafts $b^9$ and $b^{10}$; but in narrower Jacquard machines it is sufficient to have such apparatus at one end of the machine.

Although we have in our description and drawings described and illustrated a Jacquard machine the harness and needles of which are arranged for the manufacture of Brussels and velvet carpets and other looped and piled fabrics, it will be understood by and be obvious to persons acquainted with looms that our invention is equally applicable to other arrangements of harness and needles required for the production of other fabrics where a large number of selecting-needles are necessary. The Jacquard machine described raises the shed by means of trap or lift boards and knots on the harness; but it will be obvious that our double Jacquard machine can be constructed to work by other means—such as, for example, by hooks and a grid—without affecting the principle of the invention.

We would here remark that we are aware that it has been before proposed to employ double Jacquard machines or machines with two card-cylinders, and that we do not therefore claim, broadly, a Jacquard machine with two card-cylinders, but only when arranged to operate for the purpose and in the manner, or in an equivalent manner, to that hereinbefore described.

Having now particularly described and ascertained the nature of the said invention and in what manner the same is to be performed, we declare that what we claim is—

1. The described combination, in a Jacquard machine, of two card-cylinders placed front and back of each other, as set forth, the harness-cords and their lifting devices, and two sets of selecting-needles, with lever $e^5$, slotted rod $e^3$, and cranked lever $b^7$, rods $h^3$ $h^4$, studs $h'$ $h^2$, regulating-swivels $h^5$ $h^6$, shafts $h^{11}$ $h^{12}$, levers $h^7$ $h^8$, and their arms $j'$ $j^2$, the combination serving to cause cards carried by the cylinders to act simultaneously on their respective sets of selecting-needles and to form the shed or lift of the warp, substantially as hereinbefore set forth.

2. The combination, with the cam-shaft of a loom, and with its cam and the intermediate devices—namely, lever $a^8$, rod $a$, lever $a^2$, bell-crank lever $a^5$, rod $b'$, bell-crank $b^7$, and rod $e^3$—of different sets of selecting-needles placed one set behind the other from the front part of the loom, card-cylinders placed, respectively, one at the front and one at the back of the loom, and devices, substantially as described, consisting of the lever $e^5$, rods $h^3$ $h^4$, studs $h'$ $h^2$, regulating-swivels $h^5$ $h^6$, shafts $h^{11}$ $h^{12}$, levers $h^7$ $h^8$, and their arms $j'$ $j^2$, whereby the cards carried by the respective cylinders shall be caused to act simultaneously on their respective sets of selecting-needles, substantially as and for the purpose set forth.

EDWARD CROSSLEY.
H. NORMAN MELLOR.

Witnesses:
 WM. THOS. DEWHIRST,
*Swires Road, Halifax, Comml. Clerk.*
 JAMES ED. MALLERISON,
*Hyde Park Road, Halifax, Comml. Clerk.*